United States Patent [19]

Anderson

[11] Patent Number: 4,907,961
[45] Date of Patent: * Mar. 13, 1990

[54] OXYGEN JET BURNER AND COMBUSTION METHOD

[75] Inventor: John E. Anderson, Somers, N.Y.

[73] Assignee: Union Carbide Corporation, Danbury, Conn.

[*] Notice: The portion of the term of this patent subsequent to Nov. 7, 2006 has been disclaimed.

[21] Appl. No.: 190,680

[22] Filed: May 5, 1988

[51] Int. Cl.$^4$ .............................................. F23C 5/00
[52] U.S. Cl. ...................................... 431/8; 431/187; 239/423
[58] Field of Search ...................... 431/8, 9, 181, 187; 239/423, 424, 424.5

[56] References Cited

U.S. PATENT DOCUMENTS

| | | | |
|---|---|---|---|
| 2,941,587 | 6/1960 | Hagy et al. | 158/99 |
| 3,132,683 | 5/1964 | Meyer | 158/28 |
| 3,905,751 | 9/1975 | Hemsath et al. | 431/183 |
| 4,023,921 | 5/1977 | Anson | 431/9 |
| 4,181,491 | 1/1980 | Hovis | 431/187 |
| 4,378,205 | 3/1983 | Anderson | 431/5 |
| 4,431,400 | 2/1984 | Kobayashi et al. | 431/6 |
| 4,488,682 | 12/1984 | Kobayashi et al. | 239/132.3 |
| 4,525,138 | 6/1985 | Snyder et al. | 431/187 |
| 4,541,796 | 9/1985 | Anderson | 431/187 |
| 4,541,798 | 9/1985 | Miller et al. | 431/266 |
| 4,622,007 | 11/1986 | Gitman | 432/13 |
| 4,693,680 | 9/1987 | Snyder et al. | 432/10 |
| 4,797,087 | 1/1989 | Gitman | 431/187 X |

FOREIGN PATENT DOCUMENTS

1215925 12/1970 United Kingdom .

Primary Examiner—Carl Price
Attorney, Agent, or Firm—Stanley Ktorides

[57] ABSTRACT

A burner and combustion method employing oxygen or oxygen-enriched air as the oxidant comprising a low velocity oxidant stream in proximity to high velocity main oxidant within a combustion zone enabling efficient combustion with a stable flame at very high oxidant velocities.

22 Claims, 13 Drawing Sheets

OXYGEN JET BURNER AND COMBUSTION METHOD

TECHNICAL FIELD

This invention relates to post-mixed burners employing oxygen or oxygen-enriched air as the oxidant.

BACKGROUND ART

A post mixed burner is a burner in which the fuel and oxidant are injected separately from the burner. The fuel and oxidant mix and react outside the burner. Most industrial furnaces use post-mixed burners.

A number of advantages can be identified using post-mixed burners in which oxidant, comprising pure oxygen or oxygen enriched air, is supplied to the combustion zone as high velocity jets and the fuel gas is entrained into the oxidant jets. One such advantage is that the burner can be designed to be very flexible because a wide variety of flame patterns are possible. The heat transfer pattern in a furnace can be altered substantially just by changing the oxidant nozzle. Another advantage is that the circulation patterns brought about by the high velocity oxidant jets result in uniform heating of the furnace. A third advantage is that the flame can be directed so as to increase the heat transfer rate to the workload. A further advantage is that mixing of the fuel and oxidant is enhanced so as to ensure complete combustion. Yet another advantage is that the formation of nitrogen oxides is reduced with high velocity jets due to the short contact at high flame temperatures within the jet.

A recent significant advance in the field of post-mixed burners is the aspirating burner and method developed by Dr. John E. Anderson which is disclosed and claimed in U.S. Pat. No. 4,378,205 and U.S. Pat. No. 4,541,796.

A problem with post mixed burners is the attainment of good flame stability. The flame around a high velocity oxygen jet entraining gaseous fuel is easily extinguished. For conventional air burners this problem is overcome by using a burner block. Recirculation of the hot combustion products within the block serves to enhance ignition. However, if this is done with pure oxygen or oxygen-enriched air as the oxidant, the burner block would become excessively hot and melt.

In order to fully realize the advantages of using high velocity oxidant jets in a post mixed burner, it is important to stabilize the flame without destroying the integrity of the jet.

The aforesaid aspirating burner and method addresses the problem of flame stability. When operating in a hot furnace, the surrounding hot gases serve to enhance ignition. Prior to mixing and reaction with the fuel, hot furnace gases are entrained into the high velocity oxidant jets. The oxidant is heated by these hot gases to a sufficiently high temperature so that the oxidant will react upon contact with the fuel gas. When operating in a cold furnace, it is necessary to bring the temperature of the fuel up to a level at which it will react upon contact with the high velocity oxidant jet. This is accomplished by supplying about 5 to 10 percent of the total oxygen required for combustion as an annular stream around the fuel stream. The annulus oxidant and fuel react heating up the fuel stream. The high velocity oxidant stream first entrains cold furnace gas followed by the heated, partially burned fuel stream. The fuel stream is at a sufficiently high temperature so that the unburned fuel will react on contact with the high velocity oxidant.

It is desirable to have a post-mixed burner and method employing high velocity oxidant jets wherein good flame stability is attained.

Accordingly, it is an object of this invention to provide a post-mixed burner and method employing oxygen or oxygen-enriched air as the oxidant wherein the oxidant may be injected directly into the furnace zone at high velocity and wherein good flame stability is attained.

SUMMARY OF THE INVENTION

The above and other objects which will become apparent to one skilled in the art upon a reading of this disclosure are attained by the present invention, one aspect of which is:

A method for combusting fuel and oxidant comprising:

(A) injecting into a combustion zone the major portion of the oxidant required for the combustion, said major oxidant comprising at least 30 volume percent oxygen, as at least one stream at a high velocity V which is greater than 5P where P is the volume percent oxygen in the major oxidant and V is in feet per second;

(B) injecting into said combustion zone in proximity to the major oxidant, a minor portion of the oxidant required for the combustion, said minor portion comprising at least 1 percent of the total oxygen injected into the combustion zone, said minor oxidant comprising at least 30 volume percent oxygen, at a low velocity less than 0.5 V;

(C) injecting gaseous fuel into the combustion zone in proximity to the minor oxidant to form an interface between said gaseous fuel and said minor oxidant, at a velocity such that the low velocity of the minor oxidant is within 200 feet per second of the velocity of the gaseous fuel at the interface;

(D) combusting minor oxidant with gaseous fuel at the interface;

(E) entraining minor oxidant into the high velocity major oxidant immediately after injection of the major oxidant into the combustion zone, and thereafter entraining gaseous fuel into the high velocity major oxidant; and (F) drawing hot combustion products from the interface into the high velocity major oxidant, said hot combustion products serving as a continuous source of ignition for the fuel and major oxidant, and combusting gaseous fuel and high velocity major oxidant in a stable flame.

Another aspect of the present invention is:

Burner apparatus for use with pure oxygen or oxygen-enriched air as the oxidant comprising:

(A) means for providing major oxidant for injection into a combustion zone, said major oxidant provision means connected by conduit means to a source of oxidant comprising at least 30 volume percent oxygen, and comprising a central oxidant supply tube and a nozzle at the injection end of the supply tube, said nozzle having at least one orifice therethrough for passage of oxidant from the supply tube into the combustion zone;

(B) an annular opening around the nozzle for providing minor oxidant to the combustion zone in proximity to the major oxidant injection so that minor oxidant is entrained into major oxidant immediately after injection of major oxidant into the combustion zone; and (C) means for providing gaseous fuel to said combustion zone in proximity to the minor oxidant provision means so that said gaseous fuel and minor oxidant form an interface within the combustion zone prior to contact between gaseous fuel and major oxidant.

As used herein the term "combustion zone" means a volume in which fuel and oxidant mix and react to release heat.

As used herein, the term "pure oxygen" means a gas having an oxygen concentration of at least 99.5 percent.

As used herein, the term "interface" refers to the plane or space where the gaseous fuel and the minor oxidant interact. The interface has a finite thickness as the oxidant diffuses into the fuel gas and the fuel gas diffuses into the oxidant so as to form a combustible mixture.

As used herein, the term "gaseous fuel" means a fuel composed of one or more of the following: one or more gaseous components some or all of which are combustible; liquid fuel droplets dispersed in a gaseous medium; solid fuel particles dispersed in a gaseous medium.

As used herein, the term "apparent jet velocity" means the volumetric flow rate, at ambient pressure, leaving an orifice divided by the cross sectional area of the orifice.

As used herein, the term "blow-off velocity" means the maximum jet velocity, as measured at the orifice, that a flame can be maintained for an oxidant jet surrounded by gaseous fuel. Below the blow off velocity the flame around the jet is stable. Above the blow off velocity a flame cannot be maintained.

DETAILED DESCRIPTION

The invention will be described in detail with reference to the Drawings.

Figure 1:
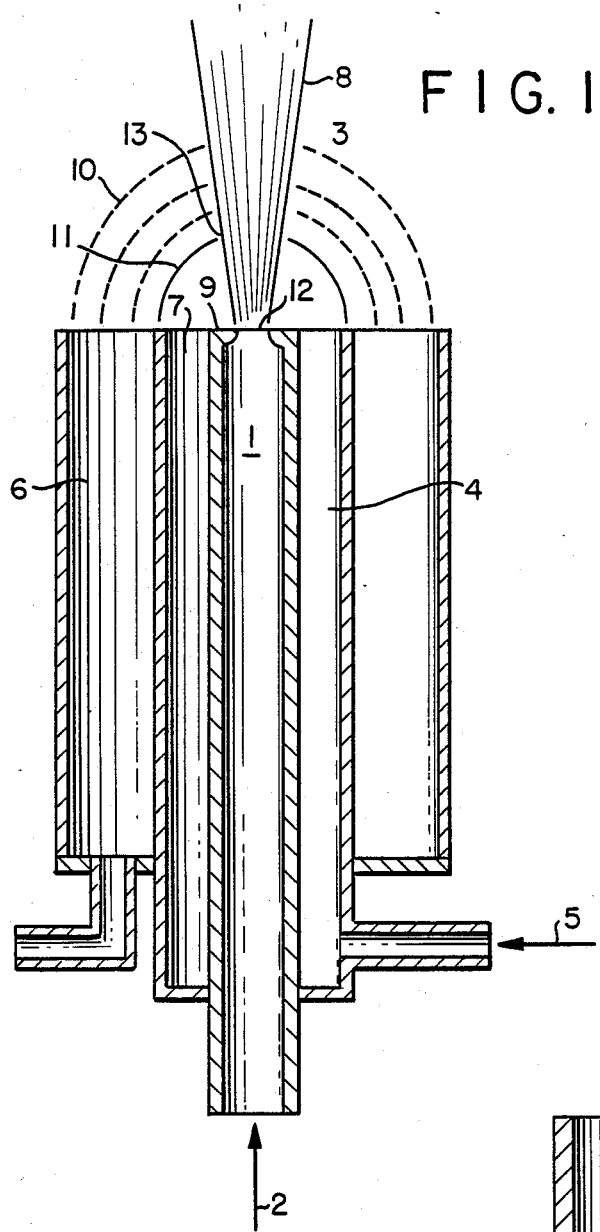
FIG. 1 is a cross-sectional view of one embodiment of the burner of this invention.

Referring now to FIG. 1, passage 1 is connected by conduit means 2 to a source (not shown) of oxidant comprising at least 30 volume percent oxygen. Sources of oxygen include, for example, a gas storage cylinder, a liquid oxygen tank from which the oxygen is vaporized prior to use and, for larger requirements, an air separation plant such as a cryogenic rectification plant or a pressure swing adsorption plant. Oxygen-enriched air may also be produced by combining high purity oxygen with air and passing the combined stream to conduit means 2. The oxidant passes out of passage 1 through a nozzle 9 having one or more orifice openings 12 and into combustion zone 3.

FIG. 1 illustrates a preferred embodiment of the invention wherein the low velocity oxidant stream proximate to the high velocity oxidant stream is an annular stream which forms an annular envelope around the high velocity stream. However, the low velocity oxidant stream need not completely surround the high velocity oxidant stream. The annular stream could also comprise a number of low velocity jets from a number of holes rather than a continuous annular opening. Furthermore, if, for example, the high velocity oxidant stream were not round but were a plane jet, the low velocity oxidant stream could be an adjacent plane stream.

Referring back now to FIG. 1, coaxial to passage 1 is annular passage or opening 4 which is connected by conduit means 5 to a source (not shown) of oxidant comprising at least 30 volume percent oxygen. Oxidant passes out of annular passage 4 directly into combustion zone 3 and forms an envelope surrounding the oxidant passing out of central passage 1 at, and for a short distance beyond, their respective injection points.

Gaseous fuel, such as natural gas, hydrogen, coke oven gas, propane, and the like, is provided to combustion zone 3 by means separate from the oxidant passages so that at the start of the combustion zone, the fuel is proximate to the low velocity oxidant stream. In the embodiment illustrated in FIG. 1, fuel is provided directly to the combustion zone 3 through passage 6 which is coaxial and next to the outer surface of the low velocity oxidant annular stream at their respective injection points.

Passage 1 carries the major portion of the oxidant necessary for combustion with the fuel and coaxial passage 4 carries the minor portion or the remainder of the total oxidant. The minor oxidant comprises at least 1 percent of the total oxygen supplied to the combustion zone. Preferably the minor oxidant comprises less than 10 percent of the total oxygen supplied to the combustion zone.

Both the major and the minor portions of the oxidant contain at least 30 volume percent oxygen. However, it is not necessary that the minor portion of the oxidant have the same oxygen concentration as that of the major portion of the oxidant.

The major oxidant is injected into combustion zone 3 from passage 1 as a high velocity jet 8 with a velocity V at the exit orifice 12 greater than 5P, where V is velocity in ft/sec and P is the volume percent oxygen in the major portion of the oxidant.

The minor oxidant is injected into the combustion zone 3 from annular passage or opening 4 at a low velocity less than 0.5 V such that the low velocity of the minor oxidant is within 200 feet per second of the velocity of the gaseous fuel at their interface. Preferably the velocity of the minor oxidant is less than 100 ft/sec.

Referring again to FIG. 1, a low velocity stream of oxidant flows from exit 7 at the end of passage 4. This low velocity stream forms an envelope around the high velocity jet 8 of the major oxidant exiting orifice 12 at the end of passage 1. The high velocity jet from orifice 12 entrains surrounding gases as it passes through combustion zone 3. The first gas entrained after leaving the nozzle is the low velocity annulus stream of oxidant which is entrained into the major oxidant immediately after injection of the major oxidant into the combustion zone. This is followed by the entrainment of gaseous fuel. The flow lines for the gaseous fuel being entrained into the oxidant jet 8 are represented by the dotted lines 10 in FIG. 1. A combustion interface 11 is formed between the low velocity oxidant stream and the gaseous fuel as both streams are drawn into the high velocity oxidant jet. Ignition of the fuel and low velocity oxidant is initiated by any suitable ignition means. Since the annulus stream of the minor oxidant is moving at a low velocity relative to the fuel gas, a stable flame can be maintained at the interface 11. The hot combustion products from this flame are drawn into the jet at point 13, generally less than a distance equal to 6 times the diameter of orifice 12 in nozzle 9, and before any substantial dilution of the major oxidant by furnace gases can occur. This is the exact point where fuel is starting to be drawn into the high velocity oxidant jet and starts mixing with the major oxidant. For the embodiment of the invention as shown in FIG. 1, the intersection 13 is a circle around the periphery of the oxidant jet. The hot combustion products from the annulus oxidant-fuel flame serve as a continuous source of ignition at the intersection point 13 where the fuel and major oxidant first meet. This is the ideal location for ignition. This continuous source of ignition prior to any substantial dilution of the major oxidant by furnace gases, makes it possible to maintain stable combustion with the fuel and oxidant at the interface of the high velocity oxidant jet 8. This is accomplished without changing the integrity of the jet of major oxidant.

Figure 3:
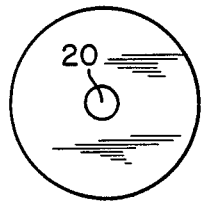
FIG. 3 is a head on view of the oxidant nozzle illustrated in FIG. 2.
Figure 2:
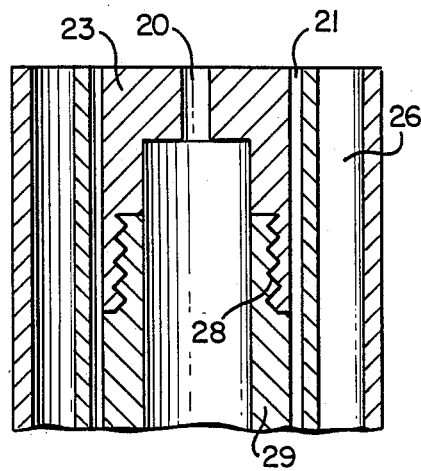
FIG. 2 is a cross-sectional view of a single orifice nozzle set in a burner of this invention.
Figure 4:
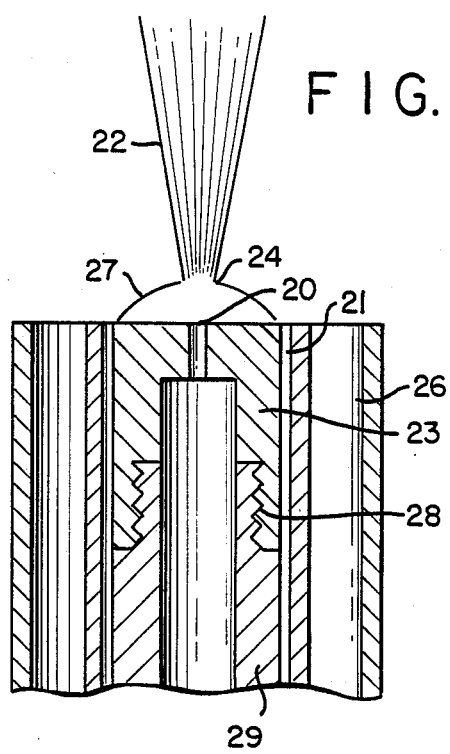
FIG. 4 is an illustration of the flame obtained from the practice of this invention using the burner illustrated in FIG. 2.

FIGS. 2-4 illustrate the embodiment of the invention in a burner using a single orifice for the high velocity oxidant. The oxidant nozzle is shown separately in FIG. 3 and is shown incorporated into the burner in FIGS. 2 and 4. The flame is illustrated in FIG. 4. Referring to FIG. 4, the high velocity oxidant is injected through the single orifice 20 while the low velocity oxidant is injected through the annulus passage 21. Fuel gas is injected into the combustion zone through passage 26. As the low velocity oxidant and fuel gas are entrained into the high velocity oxidant jet 22, a stable flame is formed at the interface 27 with the low velocity oxidant on one side and fuel gas on the other side. This flame at the interface forms an envelope around the nozzle meeting the high velocity oxidant jet 22 at point 24. This point is where fuel gas is first drawn into the high velocity oxidant jet. Continuous ignition between the fuel gas and main oxidant is established and maintained at a point 24 by the supply of hot combustion products from the flame at interface 27. Nozzle 23 is removable and is screwed into the oxidant supply tube 29 at threads 28. In this way the major oxidant nozzle can be easily replaced and the burner altered to operate in a different mode as desired.

Figure 6:
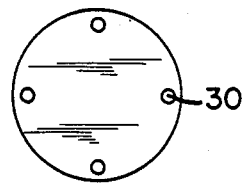
FIG. 6 is a head-on view of the oxidant nozzle illustrated in FIG. 5.
Figure 5:
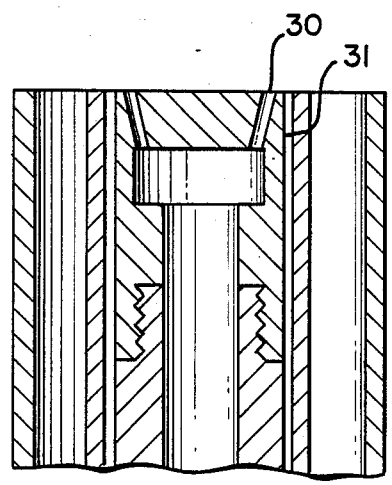
FIG. 5 is a cross sectional view of a multiple-orifice nozzle set in a burner of this invention.

In a preferred embodiment of the invention, the high velocity oxidant is injected into the combustion zone through a plurality of small diameter orifices. With a single, large diameter orifice, the high velocity jet entrains the fuel over an extended distance and the entrainment near the high velocity oxidant orifice may be insufficient to over come buoyancy and natural convection forces. As a result, gaseous fuel can escape the high velocity oxidant jet and remain unburned. FIGS. 5 and 6 illustrate the embodiment of the invention in a burner using four orifices for the high velocity oxidant. The oxidant nozzle is shown separately in FIG. 6 and is shown incorporated into the burner in FIG. 5. As illustrated in FIG. 5, the four orifices 30 are angled out from the burner axis so that the high velocity oxidant jets do not interfere with each other. By changing the single orifice nozzle 23 in FIG. 4 with the nozzle 31 in FIG. 5 containing four orifices, the entrainment of the fuel occurs closer to the high velocity oxidant orifice and the tendency to lose gaseous fuel due to buoyancy and natural convection forces is greatly reduced. In this preferred embodiment of the invention, it is particularly preferred that there be more than three orifices for the high velocity oxidant and each orifice be less than $\frac{1}{4}$ inch in diameter.

Figure 8:
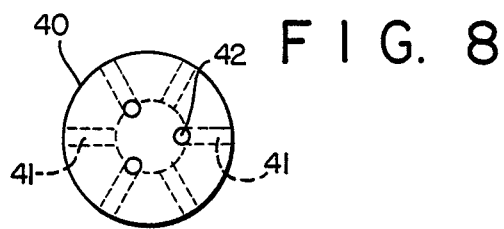
FIG. 8 is a head-on view of the oxidant nozzle illustrated in FIG. 7.
Figure 7:
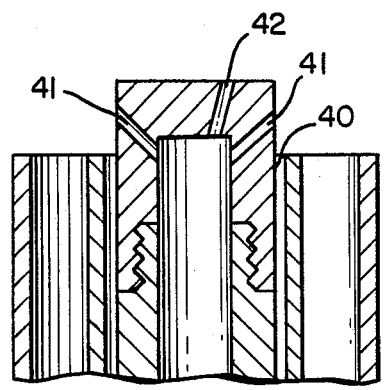
FIG. 7 is a cross sectional view of another multiple-orifice nozzle set in a burner of this invention.

Another embodiment of the invention is shown in FIGS. 7 and 8. The oxidant nozzle is shown separately in FIG. 8 and is shown incorporated into the burner in FIG. 7. The single orifice nozzle 23 in FIG. 4 is replaced by a multi-orifice nozzle 40 shown in FIG. 7. This nozzle has two sets of orifices. The first set of six orifices 41 are evenly spaced around the periphery of the nozzle 40 and angled out from the nozzle surface. The second set of three orifices 42 are on the face of the nozzle and angled out from the burner axis. Preferably, the more radially directed orifice or orifices 41 are oriented at least 10 degrees outward of the more axially oriented orifice or orifices 42. The burner embodiment employing a nozzle having more radially directed and more axially directed orifices for injection of major oxidant into the combustion zone may be advantageously use to carry out combustion with lower nitrogen oxide formation because of the sequential nature of the contact of the fuel with the major oxidant.

Figure 10:
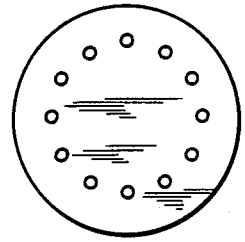
FIG. 10 is a head-on view of the oxidant nozzle illustrated in FIG. 9.
Figure 9:
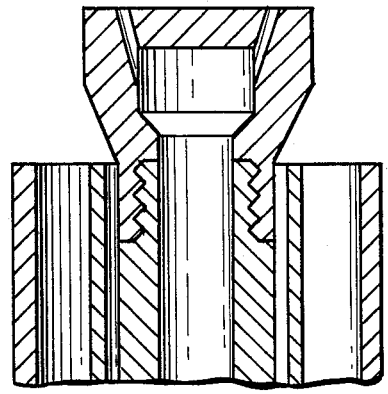
FIG. 9 is a cross sectional view of another multiple-orifice nozzle set in a burner of this invention.
Figure 11:
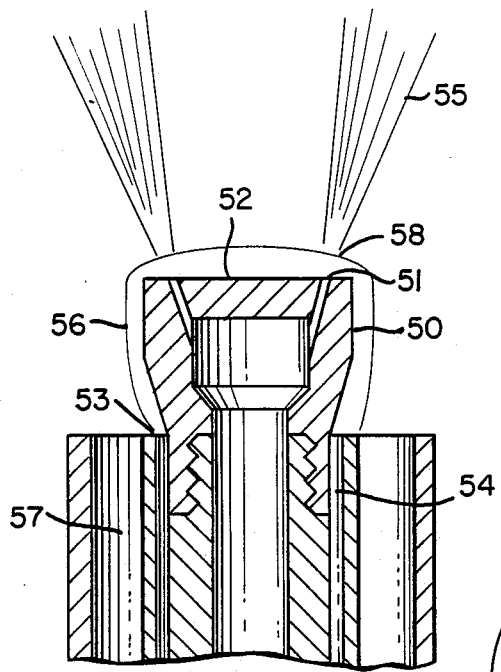
FIG. 11 is an illustration of the flame obtained from the practice of this invention using the burner illustrated in FIG. 9.

Another embodiment of the invention is shown in FIGS. 9, 10, and 11. The oxidant nozzle is shown separately in FIG. 10 and is shown incorporated into the burner in FIGS. 9 and 11. The flame is illustrated in FIG. 11. The single orifice nozzle 23 in FIG. 4 is replaced by a multi-orifice nozzle 50 as shown in FIG. 11. Twelve orifices 51 are evenly spaced around a circle on the face of the nozzle 52. The orifices are angled out from the axis of the burner. In order to accommodate the orifices with adequate spacing between adjacent orifices, the nozzle is extended beyond exit 53 of the annulus oxidant passage 54 and enlarged to provide greater area for the nozzle face 52. In this embodiment of the invention, the low velocity annulus stream of oxidant leaving exit 53 flows along the periphery of the nozzle 50 before being entrained into the high velocity jets 55 of the major oxidant. The flame at the interface 56 of the low velocity oxidant and the fuel gas forms an envelope around the portion of the nozzle extending into the combustion zone. Continuous ignition of the fuel from passage 57 and the high velocity oxidant jets 55 is provided at the point 58 where the fuel annulus oxidant interface 56 intersects with the high velocity jets 55.

In a preferred embodiment of the invention, the orifices 51 are angled out from the burner axis by more than 10 degrees.

Figure 13:
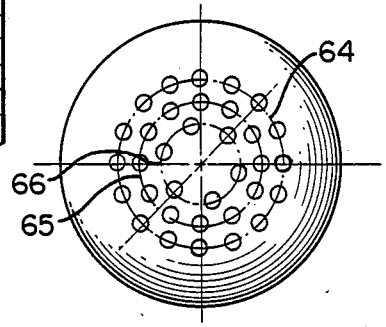
FIG. 13 is a head-on view of the oxidant nozzle illustrated in FIG. 12.
Figure 12:
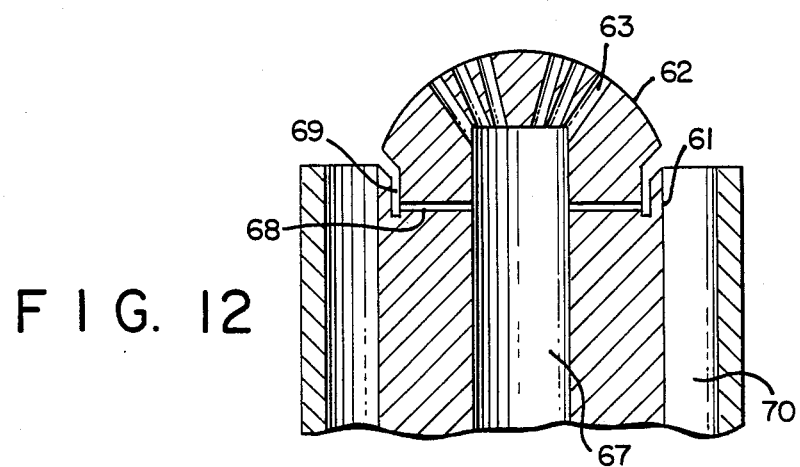
FIG. 12 is a cross sectional view of another multiple-orifice nozzle set in a burner of this invention.

Another embodiment of the invention is shown in FIGS. 12 and 13. The oxidant nozzle is shown separately in FIG. 13 and is shown incorporated into the burner in FIG. 12. The oxidant nozzle 61 has a spherical surface 62. The orifices 63 for the high velocity oxidant jets are drilled perpendicular to this surface towards the center of the sphere. The orifices are located on three concentric circles 64, 65, and 66 with a common center as shown in FIG. 13. Oxidant to the orifices is supplied through passage 67. A small portion of the oxidant, between 1 and 10 percent of the total oxidant, is withdrawn from passage 67 through bleed passages 68 to the annular passage 69. Fuel is supplied through passage 70 surrounding the nozzle. The oxidant exiting passage 69 provides the low velocity oxidant stream required to stabilize the flame around the high velocity oxidant jets from orifices 63. The stream of oxidant from annular passage 69 flows along the spherical surface prior to being entrained into the high velocity jets. The flame at the interface of the annular oxidant stream and the fuel forms an envelope around the spherical surface of the nozzle.

Figures 14, 15:
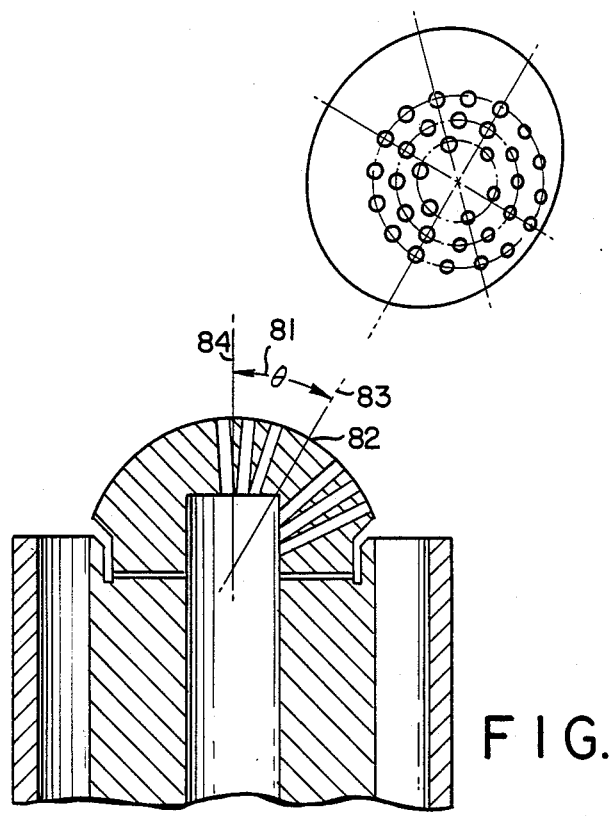
FIG. 14 is a cross-sectional view of another multiple-orifice nozzle set in a burner of this invention.
FIG. 15 is a head-on view at an angle of 30 degrees relative to the burner axis for the oxidant nozzle illustrated in FIG. 14.

The common center for the concentric circles in FIG. 13 is located along the axis of the burner. The invention can also be practiced with the center of the concentric circles at a point removed from the axis as shown in FIGS. 14 and 15. The oxidant nozzle is shown separately in FIG. 15 and is shown incorporated into the burner in FIG. 14. A line 83 is shown in FIG. 14 at an angle 81 with a line 84 drawn through the burner axis. Line 83 intersects the nozzle surface at point 82. The concentric circles for locating the orifices on the nozzle surface have a common center on the line 83. The low velocity oxidant annulus stabilizes the flames around the high velocity oxidant jets in the same manner as described for the burner configuration in FIGS. 12 and 13. The flame pattern is determined by the direction of the high velocity oxidant jets. When the invention is practiced as shown in FIGS. 14 and 15, the jet flames are then angled away from the burner axis. In this way, the nozzle can be changed to obtain the same effect as angling the whole burner.

The invention can also be practiced with multi-orifice nozzles with an asymetric hole pattern.

The following Examples and Comparative Examples serve to further illustrate the present invention or to provide comparative results. They are presented for illustrative purposes and are not intended to be limiting.

EXAMPLE 1

Burner tests were conducted using apparatus similar to that illustrated in FIG. 1. For comparison, the burner was operated with and without the flow of oxygen through the annulus. The fuel was natural gas and the oxidant was pure oxygen. The oxygen was injected into the combustion zone through a nozzle having a single orifice and with a diameter of 1/16 inch. The oxygen velocity was slowly increased. The fuel supplied was always sufficient for complete combustion and was supplied at a velocity within the range of from 1 to 3 ft/sec. Without the flow of oxygen through the annulus, the flame was stable up to an oxygen jet velocity of 167 ft/sec. At this point, the flame started to detach partially with only a portion still attached to the nozzle. As the oxygen jet velocity was increased further the flame instability became more severe until, at an oxygen velocity of 171 ft/sec, the flame extinguished. This point is known as the blow-off velocity. The flame could not be reignited at this jet velocity.

Figure 16:
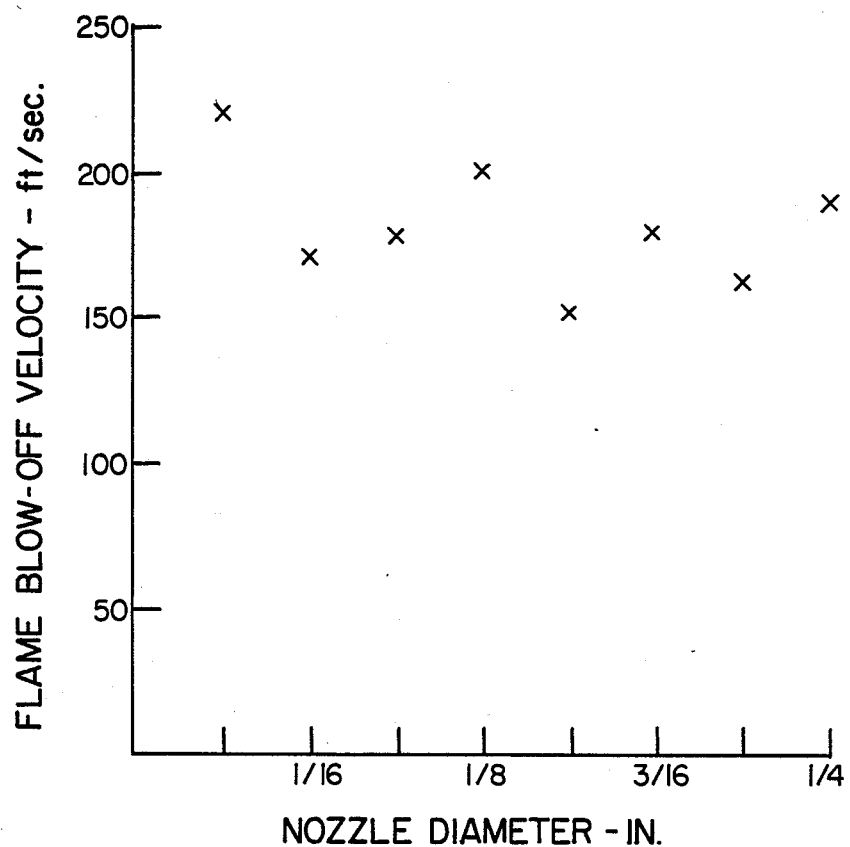
FIG. 16 is a plot of the blow off velocity for an oxygen jet into natural gas as a function of the orifice diameter using a burner such as that shown in FIG. 1 but without the low velocity oxidant of the invention.

Similar results were obtained when the test procedure was repeated for different nozzle sizes. The orifice size for the oxygen nozzle was varied from 1/32 inch to ¼ inch. The blow off velocity was measured and the plotted results are shown in FIG. 16. As illustrated in the plot, the blow off velocity ranged between 150 and 230 ft/sec.

The test procedure was repeated with a 1/16 inch diameter oxygen nozzle but with oxygen flowing through the annulus at a flow rate, 2.1 to 2.5 cubic feet per hour (CFH), corresponding to a velocity of about one ft/sec at the annulus exit. With the annulus oxygen, a stable jet flame was obtained at oxygen flow rates up to 156 CFH through the 1/16 inch oxygen nozzle corresponding to an apparent jet velocity of 2030 ft/sec. This was the limit for the flow of oxygen through the lines at the available flow of oxygen through the lines at oxygen pressure. The blow off velocity, which was not established, was an even higher velocity. When the oxygen to the annulus was turned off, the flame around the jet extinguished.

The use of the low velocity flow of oxygen through the annulus in proximity to the high velocity major oxygen increased the blow off velocity for the oxygen jet by more than an order of magnitude.

EXAMPLE 2

The same test apparatus and procedure described in Example 1 was used with hydrogen as the fuel and pure oxygen as the oxidant. The velocity of the hydrogen stream was between 2 and 3 ft/sec. The data are tabulated in Table 1. The flowrate in CFH and the apparent jet velocity in ft/sec are given for both the oxygen annulus stream and the jet from the oxygen nozzle. By passing a low velocity flow of oxygen through the annulus, a stable flame around the jet could be maintained at much higher jet velocities. The use of the oxygen annulus to greatly extend the oxygen jet velocity range for stable flames applies as well for hydrogen as a fuel as it does for natural gas.

TABLE 1

| Oxygen Nozzle Orifice Diameter (inch) | Oxygen Annulus CFH | Oxygen Annulus ft/sec | Oxygen Nozzle CFH | Oxygen Nozzle ft/sec |
|---|---|---|---|---|
| 1/16 | 0 | 0 | 31 | 404 (*1) |
| 1/16 | 3.8 | 1.5 | 189 | 2460 (*2) |
| 3/32 | 0 | 0 | 72 | 417 (*1) |
| 3/32 | 3.8 | 1.5 | 349 | 2020 (*2) |
| ⅛ | 0 | 0 | 123 | 401 (*1) |
| ⅛ | 5.7 | 2.3 | 519 | 1690 (*2) |

(*1) Blow off velocity. A flame could not be maintained around the oxygen jet at this velocity.
(*2) Maximum flow that could be obtained through the oxygen line at the available pressure. The flame around the oxygen jet was stable at this velocity.

EXAMPLE 3

Figure 17:
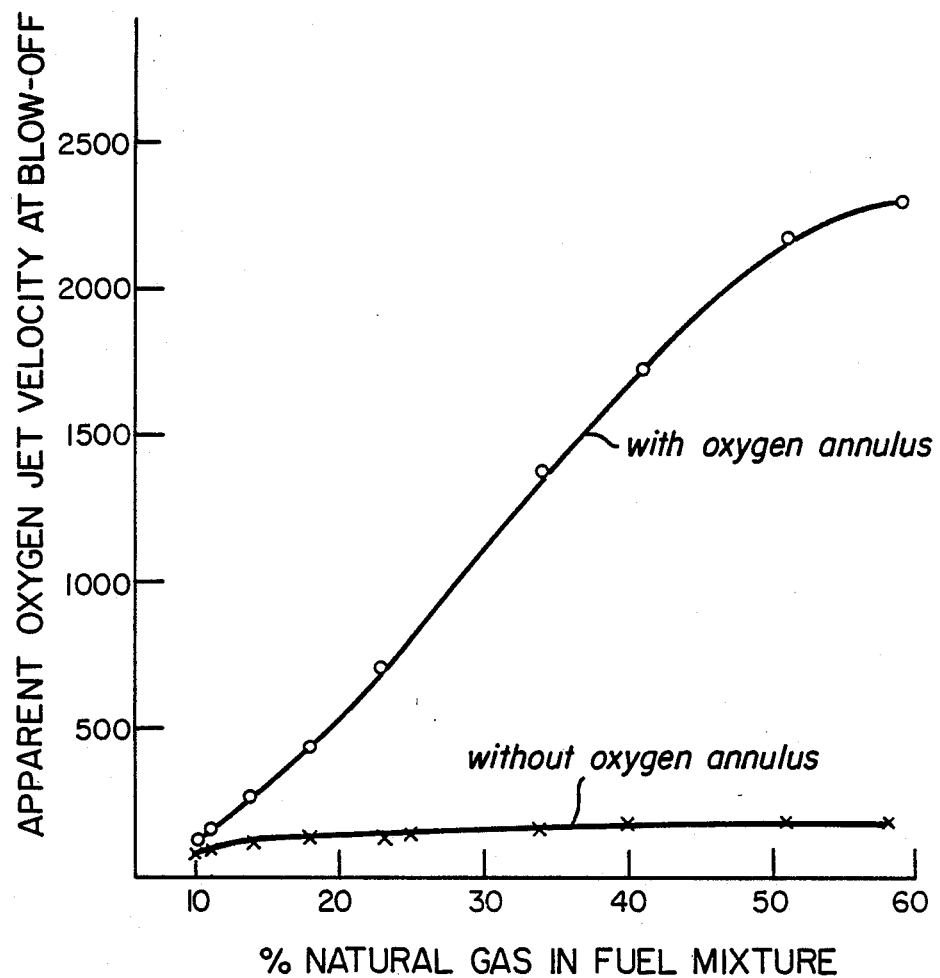
FIG. 17 is a plot of the blow-off velocity for an oxygen jet into a natural gas-nitrogen fuel mixture as a function of the natural gas concentration using a burner such as that shown in FIG. 1 both with and without the low velocity oxidant of the invention.

The same test apparatus and procedure described in Example 1 was used with natural gas-nitrogen mixtures as the fuel, with pure oxygen as the oxidant, and with a ⅛ inch diameter orifice for the oxygen nozzle. The velocity of the fuel stream was between 4 and 11 ft/sec. The blow off velocity was measured with and without oxygen flow to the annulus for different fuel mixtures. For tests in which oxygen was used in the annulus, the oxygen flow rate to the annulus ranged between 1.2 and 10.7% of the total oxygen and the velocity of the annulus stream ranged between 1 and 7 ft/sec. The results are plotted in FIG. 17. As illustrated in the plots, the blow off velocity increased substantially with the use of the oxygen annulus. For example, with a 50% natural gas—50% nitrogen mixture, the blow off velocity was 185 ft/sec without the annulus oxygen and 2150 ft/sec with the annulus oxygen. The oxygen flow rate to the annulus for this particular fuel mixture was 9.2 CFH corresponding to 1.3% of the total oxygen and a stream velocity of 3.6 ft/sec. The velocity of the fuel stream was 5 ft/sec. The use of the oxygen annulus for this fuel mixture increased the blow off velocity by more than an order of magnitude.

EXAMPLE 4

Figure 18:
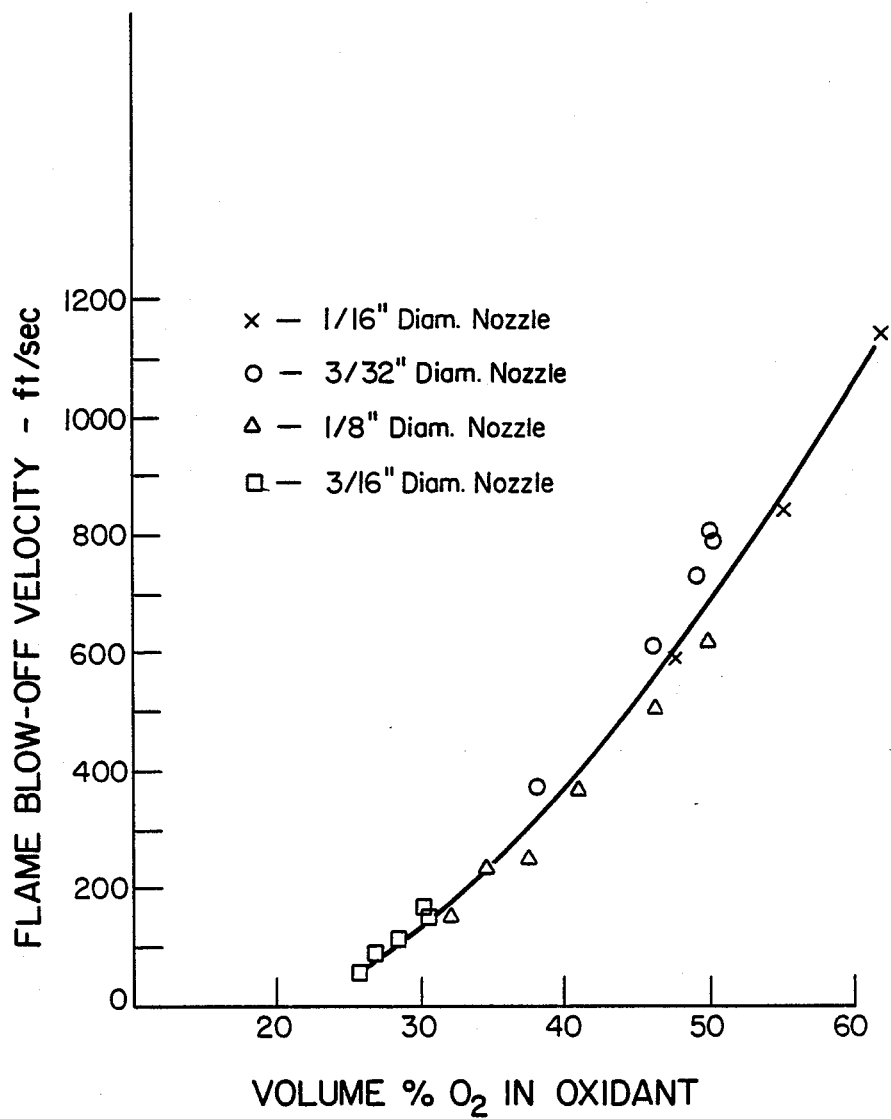
FIG. 18 is a plot of the blow-off velocity for an oxygen-nitrogen jet into natural gas as a function of the oxygen concentration in the oxidant using a burner such as that shown in FIG. 1 with the low velocity oxidant of the invention.

The same test apparatus and procedure described in Example 1 was used with natural gas as the fuel and with oxygen—nitrogen mixtures as the oxidant. Orifice diameters of 1/16, 3/32, ⅛, and 3/16 inches were used for the oxidant nozzle. All blow off velocity measurements were made with the oxidant flowing through the annulus. The concentration of oxygen in the annulus stream was always the same as that for the oxidant to the nozzle. The flow rate of oxidant to the annulus ranged between 3 and 13% of the total oxidant flow. The velocity of the oxidant annulus stream varied between 1 and 6 ft/sec. The velocity of the fuel stream was between 4 and 11 ft/sec. The blow off velocity is plotted versus the percent oxygen in the oxidant in FIG. 18. As illustrated in the plot, the blow-off velocity decreases substantially as the oxygen concentration in the oxidant decreases. The use of the annulus oxidant is most effective at high oxygen concentrations, substantially above the concentration of 21 volume % found in air. In fact, a indicated in the plot in FIG. 18, the advantage of using annulus oxidant to stabilize the flame around the oxidant jet is not significant at oxygen concentrations below 30 volume % in the oxidant.

EXAMPLE 5

Burner tests were conducted using apparatus similar to that illustrated in FIGS. 2 and 5 with pure oxygen as the oxidant and natural gas as the fuel. A comparison was sought between the burner operation using the embodiment of this invention for a single orifice oxygen nozzle as shown in FIG. 2 and for a multiple orifice nozzle as shown in FIG. 5. For both burner tests, the oxygen flow rate to the nozzle was 990 CFH. The natural gas flow rate was 510 CFH corresponding to a stream velocity of 11 ft/sec. The orifice sizes for both nozzles were chosen to obtain an apparent oxygen jet velocity close to 1000 ft/sec. The single orifice nozzle was 7/32 inch diameter with an apparent jet velocity of 1060 ft/sec. The multi-orifice nozzle had four holes, each 0.113 inch diameter with an apparent jet velocity of 990 ft/sec. The orifices were evenly spaced around a circle diameter of 13/16 inch and with the holes angled out 15 degrees relative to the burner axis. The burners were fired in the open atmosphere with the burner axis horizontal. For the single orifice nozzle, the combustion was stable for an annulus flow rate above 7 CFH. There was a large yellow flame above the oxygen jet flame indicating that some of the fuel was burning in air away from the jet. The entrainment of natural gas into the oxygen was not complete. Buoyancy forces were sufficient to cause a portion of the natural gas to escape the jet environment. For the multi orifice oxygen nozzle, the combustion was stable for an annulus flow rate above 9 CFH. There was no sign of burning of natural gas in air above the oxygen jet flames. All of the fuel was entrained into the oxygen jets.

EXAMPLE 6

Burner tests were conducted using apparatus similar to that illustrated in FIGS. 7 and 8. The oxygen nozzle had six orifices, each of 0.041 inch diameter, evenly spaced around the periphery of the nozzle and angled out 45 degrees from the axis. The high velocity oxygen jets from these orifices are referred to as the side jets. There were also three orifices, each of 0.070 inch diameter, evenly spaced on the face of the nozzle and angled out 15 degrees from the axis. The high velocity jets from these orifices are referred to as the front jets. The oxidant for the tests was pure oxygen while the fuel was natural gas. The oxygen flow rate for the high velocity oxygen jets was 990 CFH corresponding to an apparent jet velocity of 2030 ft/sec. About 41 percent of the oxygen to the nozzle flowed through the side jets and 59 percent flowed through the front jets. The natural gas flow rate was 510 CFH corresponding to a stream velocity of 11 ft/sec. Four transition points were identified as the annulus oxygen flow rate was varied. The velocity of the annulus stream and the percent of the total oxygen to the annulus oxygen are tabulated in Table 2 for these transition points operation:

TABLE 2

| annulus oxygen flowrate CFH | annulus oxygen velocity ft/sec | % of total oxygen to annulus stream |
|---|---|---|
| 16 | 2.0 | 1.6 |
| 21 | 2.6 | 2.1 |
| 54 | 6.7 | 5.2 |
| 85 | 10.6 | 7.9 |

Below an annulus oxygen flow rate of 16 CFH, the flames around the high velocity oxygen jets were unstable and extinguished. As the annulus oxygen flowrate was increased above 16 CFH, the flames around the high velocity side oxygen jets remained ignited with some fluctuations in the flames. At an annulus oxygen flow rate of 21 CFH, the flames around the side jets were stable with no fluctuations. The flames around the high velocity front oxygen jets were detached from the nozzle at this annulus oxygen flow rate. As the annulus oxygen flow rate was increased further, the flames around the front jets became more stable and moved closer to the nozzle face. At an annulus flow rate of 54 CFH, the flames around the front oxygen jets were attached to the nozzle face but with some fluctuations in the flames. As the annulus oxygen flow rate was increased still further, the fluctuations in the flames around the front oxygen jets lessened. At an annulus oxygen flowrate of 85 CFH, the flames around all high velocity oxygen jets were very stable with no fluctuations.

EXAMPLE 7

Burner tests were conducted using apparatus similar to that illustrated in FIGS. 9, 10 11. The orifices were evenly spaced around a 1 inch circle on the face of the nozzle and angled out 15 degrees from the nozzle axis. The number and diameter of the orifices were varied to determine the effects of the oxidant jet velocity and orifice diameter on the formation of nitrogen oxides in a high temperature furnace. The oxidant was pure oxygen and the fuel was natural gas. The oxygen flow rate to the orifices was 990 CFH. The oxygen flow rate to the annulus was 72 CFH corresponding to 6.8% of the total oxygen and an annulus stream velocity of 8.9 ft/sec. The natural gas flow rate was 510 CFH corresponding to a stream velocity of 11 ft/sec. Nitrogen at a flowrate of 25 CFH was added to the fuel stream to ensure that there was sufficient nitrogen to form nitrogen oxide. The burner was fired in a furnace 3 ft wide, 3.4 ft high, and 8 ft long. The furnace was maintained at a control temperature of 2110° F. using a thermocouple in the roof of the furnace. Samples of the flue gas were dried and then measured for nitrogen oxides. The test conditions and results are tabulated in Table 3:

TABLE 3

| Test | orifices Number | Diam - in. | Apparent Oxidant Jet Velocity ft/sec | ppm NOx |
|---|---|---|---|---|
| 1 | 3 | 0.125 | 1080 | 303 |
| 2 | 6 | 0.089 | 1060 | 222 |
| 3 | 12 | 0.0635 | 1040 | 180 |
| 4 | 3 | 0.09375 | 1910 | 216 |
| 5 | 4 | 0.09375 | 1430 | 270 |
| 6 | 6 | 0.09375 | 960 | 270 |
| 7 | 10 | 0.09375 | 570 | 430 |

Figure 19:
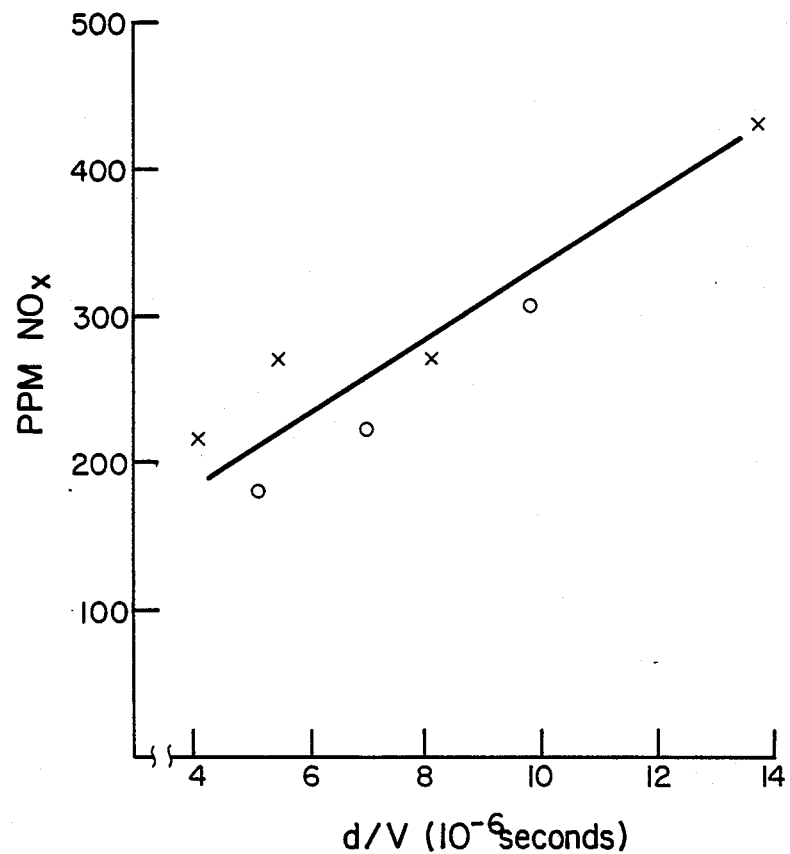
FIG. 19 is a plot of the nitrogen oxide concentration in the flue gas from a furnace as a function of the oxygen jet velocity and oxygen orifice diameter using one embodiment of the burner of this invention with different oxygen nozzles.

The burner operated stably for all test conditions while maintaining the oxygen flow to the annulus. For tests 1–3, the diameter of the orifices was varied keeping the apparent oxygen jet velocity essentially constant. As the diameter of the orifices decreased from 0.125 to 0.0635 inches, the nitrogen oxide formation decreased from 303 to 180 ppm. For tests 4 to 7, the diameter of the orifices was held constant and the apparent jet velocity was varied. As the apparent oxygen jet velocity increased from 570 to 1910 ft/sec, the nitrogen oxide formation decreased from 430 to 216 ppm. A correlation was obtained by plotting the nitrogen oxide concentration in the flue gas versus the ratio of orifice diameter, d, divided by the apparent oxygen jet velocity, V, as illustrated in FIG. 19. The data points for tests 1–3, variable orifice diameters, are represented by circles and the data points for tests 4–7, variable oxygen jet velocity, are represented by crosses. The data shows that NOx formation is a function of contact time at high temperature.

EXAMPLE 8

Burner tests were conducted using apparatus similar to that illustrated in FIGS. 12 and 13. The oxidant was pure oxygen and the fuel was natural gas. The surface of the oxygen nozzle was spherical with a 1.5 inch radius. The major portion of the oxygen passed through orifices drilled perpendicular to the spherical surface towards the center of the sphere. There were 34 orifices, each of 0.144 inch diameter. The orifices were evenly spaced around three circles each with the center at the axis of the burner. There were 6 orifices around the inner circle of 0.766 inch diameter, 12 orifices around the middle circle of 1.268 inch diameter and 16 orifices around the outer circle of 1.721 inch diameter. A portion of the oxygen was drawn from the main oxygen chamber through 8 holes of 1/16 inch diameter for the low velocity annulus stream surrounding the high velocity oxygen jets. Natural gas flowed through the passage surrounding the oxygen supply tube. The total oxygen flow rate was 20000 CFH. The oxygen flow rate through the 34 high velocity orifices was 19150 CFH, 95.8% of the total oxygen, for an apparent jet oxygen velocity of 1380 ft/sec. The oxygen flow rate through the low velocity annulus was 850 CFH, 4.2% of the total oxygen, for a stream velocity of 68 ft/sec. The natural gas flow rate was 10000 CFH for a stream velocity of 66 ft/sec. For these operating conditions the burner operated very stably with steady flames around each of the high velocity oxygen jets. All of the fuel was entrained into the oxygen jets.

EXAMPLE 9

Burner tests were conducted using apparatus similar to that illustrated in FIGS. 14 and 15. The oxygen nozzle differed from that used for the burner in Example 8 in that the three circles locating the orifices had a center through a line angled 30 degrees from the burner axis and passing through the center of the spherical surface. All dimensions and operating conditions were the same as that for Example 8. The burner operated stably with steady flames around each of the high velocity jets. All of the fuel was entrained into the oxygen jets. Compared to the burner test described in Example 8, the combustion products for the flames for this test were angled off 30 degrees.

Now by the use of the burner and method of this invention one can carry out efficient and stable combustion at very high oxidant velocity using oxygen or oxygen enriched air as the oxidant.

Although the invention has been discussed in detail with reference to certain specific embodiments, those skilled in the art will recognize that there are other embodiments of this invention within the spirit and scope of the claims.

I claim:

1. A method for combusting fuel and oxidant comprising:
    (A) injecting into a combustion zone the major portion of the oxidant required for the combustion, said major oxidant comprising at least 30 volume percent oxygen, as at least one stream at a high velocity V which is greater than 5P where P is the volume percent oxygen in the major oxidant and V is in feet per second;

(B) injecting into said combustion zone in proximity to the major oxidant, a minor portion of the oxidant required for the combustion, said minor portion comprising at least 1 percent of the total oxygen injected into the combustion zone, said minor oxidant comprising at least 30 volume percent oxygen, at a low velocity less than 0.5 V;

(C) injecting gaseous fuel into the combustion zone in proximity to the minor oxidant to form an interface between said gaseous fuel and said minor oxidant, at a velocity such that the low velocity of the minor oxidant is within 200 feet per second of the velocity of the gaseous fuel at the interface;

(D) combusting minor oxidant with gaseous fuel at the interface;

(E) entraining minor oxidant into the high velocity major oxidant immediately after injection of the major oxidant into the combustion zone and thereafter entraining gaseous fuel into the high velocity major oxidant; and (F) drawing hot combustion products from the interface into the high velocity major oxidant, said hot combustion products serving as a continuous source of ignition for the fuel and major oxidant, and combusting gaseous fuel and high velocity major oxidant in a stable flame.

2. The method of claim 1 wherein at least one of the major oxidant and minor oxidant is pure oxygen.

3. The method of claim 1 wherein said low velocity is not more than 100 feet per second.

4. The method of claim 1 wherein the oxidant injected into the combustion zone at low velocity comprises less than 10 percent of the total oxygen injected into the combustion zone.

5. The method of claim 1 wherein the low velocity oxidant stream is injected into the combustion zone as an annular stream around the high velocity oxidant so as to form a low velocity annular envelope around said high velocity oxidant.

6. The method of claim 1 wherein the minor oxidant is provided by a bleed from the major oxidant.

7. The method of claim 1 wherein the high velocity major oxidant is injected into the combustion zone as a plurality of separate oxidant streams.

8. The method of claim 7 wherein the high velocity major oxidant is injected into the combustion zone as at least one more axially directed jet and as at least one more radially directed jet wherein the more radially directed jet is oriented at least 10 degrees outward from the more axially directed jet.

9. The method of claim 1 wherein the high velocity major oxidant is injected into the combustion zone through one or more orifices having a diameter less than 0.25 inch.

10. The method of claim 1 wherein the high velocity major oxidant is injected into the combustion zone downstream of the point where the low velocity minor oxidant is injected into the combustion zone.

11. Burner apparatus for use with pure oxygen or oxygen-enriched air as the oxidant comprising:

(A) means for providing major oxidant for injection into a combustion zone said major oxidant provision means connected by conduit means to a source of oxidant comprising at least .30 volume percent oxygen, and comprising a central oxidant supply tube and a nozzle at the injection end of the supply tube, said nozzle having at least one orifice therethrough for passage of oxidant from the supply tube into the combustion zone;

(B) an annular opening around the nozzle for providing minor oxidant to the combustion zone in proximity to the major oxidant injection so that minor oxidant is entrained into major oxidant immediately after injection of major oxidant into the combustion zone; and (C) means for providing gaseous fuel to said combustion zone in proximity to the minor oxidant provision means so that said gaseous fuel and minor oxidant form an interface within the combustion zone prior to contact between gaseous fuel and major oxidant.

12. The burner of claim 11 wherein said major oxidant provision means comprises a nozzle having a plurality of orifices.

13. The burner of claim 12 wherein said plurality of orifices are directed toward the combustion zone parallel to each other.

14. The burner of claim 12 wherein said plurality of orifices are each directed toward the combustion zone at diverging angles from each other.

15. The burner of claim 12 wherein each orifice has a diameter less than 0.25 inch.

16. The burner of claim 11 wherein said major oxidant provision means comprises a removeable nozzle.

17. The burner of claim 16 wherein said removeable nozzle can be screwed into and out of the head of the burner.

18. The burner of claim 11 further comprising at least one bleed hole through the central oxidant supply tube enabling oxidant to pass from the major oxidant provision means into the annular opening.

19. The burner of claim 11 wherein the major oxidant provision means provides major oxidant into the combustion zone downstream of the point where the annular opening provides minor oxidant into the combustion zone.

20. The burner of claim 11 wherein the nozzle has a spherical surface.

21. The burner of claim 20 having a plurality of orifices through the spherical nozzle part, perpendicular to the spherical surface towards the center of the sphere and centrally oriented with respect to the burner axis.

22. The burner of claim 20 having a plurality of orifices through the spherical nozzle part, perpendicular to the spherical surface towards the center of the sphere, and offset with respect to the burner axis.

* * * * *